Jan. 5, 1971    G. J. HEH    3,553,045
METHOD FOR FORMING TWO-LAYERED EXPANDED FILAMENTOUS MAT IN
WHICH ONE LAYER IS COMPRESSED TO FORM A SKIN-BACK LAYER
Filed Nov. 23, 1965

INVENTOR.
George J. Heh

United States Patent Office 3,553,045
Patented Jan. 5, 1971

3,553,045
METHOD FOR FORMING TWO-LAYERED EXPANDED FILAMENTOUS MAT IN WHICH ONE LAYER IS COMPRESSED TO FORM A SKIN-BACK LAYER
George J. Heh, Louisville, Ky., assignor to American Air Filter Company, Inc., Louisville, Ky., a corporation of Kentucky
Filed Nov. 23, 1965, Ser. No. 509,274
Int. Cl. B23b 17/04; B32f 31/20
U.S. Cl. 156—174
1 Claim

ABSTRACT OF THE DISCLOSURE

A method for manufacturing a laminated filamentous mats and for forming a skin-back layer of high filament density on one side of such expanded filamentous mats.

BACKGROUND OF THE INVENTION

A method for making expanded filamentous mats, as well known in the art, comprises moving a filament feeding apparatus axially along a drum and feeding filaments from the filament feeding apparatus to the rotating drum. The filaments are collected on the rotating drum and the filament feeding apparatus can be reciprocated back and forth along the length of the drum a plurality of times to form a condensed mat composed of a plurality of layers of filaments. The condensed filamentous mat is then cut parallel the axis of rotation of the drum and removed from the drum as a sheet. As is known in the art, the condensed mat is then drawn in a direction transverse the lay of the filaments to stretch the mat and increase the length of the mat in the direction of draw. Drawing the condensed mat also increases the thickness of the mat by separating the filaments. The stretched, expanded mat is then much longer and much thicker than the condensed mat originally cut from the drum. The average filament concentration of the expanded mat is lower because of the separation of the filaments which occurs in expanding the mat in the direction of its thickness.

In certain applications, a method to manufacture an expanded mat having different filament concentration in selected portions of the mat is desirable. Furthermore, a method to increase filament concentration a predetermined amount in selected portions of a filamentous mat is especially desirable.

In certain other applications, it would be desirable to manufacture a filamentous mat which includes a "skin-like" layer of extremely high filament concentration. The "skin-like" layer provides strength and dimensional stability to the expanded mat. In situations where expanded mat is used to remove particulate matter from fluids and where fluid is passed through the mat in the direction of its thickness, a skin-like layer provides an area for removal of extremely fine particles from the fluid stream.

SUMMARY OF THE INVENTION

In accordance with the present invention, a novel and advantageous method is provided for making an expanded filamentous mat where the filament concentration can be controlled in a straightforward and economical manner with a minimum of operating steps and a minimum of materials, making full use of conventional equipment. The present invention further provides a novel and advantageous method for forming compressed "skin-like" layers of extremely high filament concentration in desired preselected positions throughout the thickness of the expanded mat so as to meet varying conditions which might be required of the finished product.

Various other features of the present invention will become obvious to one skilled in the art upon reading the disclosure set forth hereinafter.

In accordance with the present invention, an improved method is provided for making an expanded filamentous mat comprising: feeding filaments from filament feeder means to filament collector means; collecting filaments on a collector means at at least one angle of lay relative a preselected axis of the collector means to form a first portion of a mat; collecting filaments at a second angle of lay relative such preselected axis of the collector means to form a second portion of the mat, applying a binder to the mat; stretching the mat in a direction transverse the general lay of filaments of the mat to expand the mat in the direction of the thickness of the mat and form an expanded filamentous mat; and compressing the expanded mat a selected amount.

Referring to the drawings which disclose one advantageous embodiment of the present invention:

Figure 1:
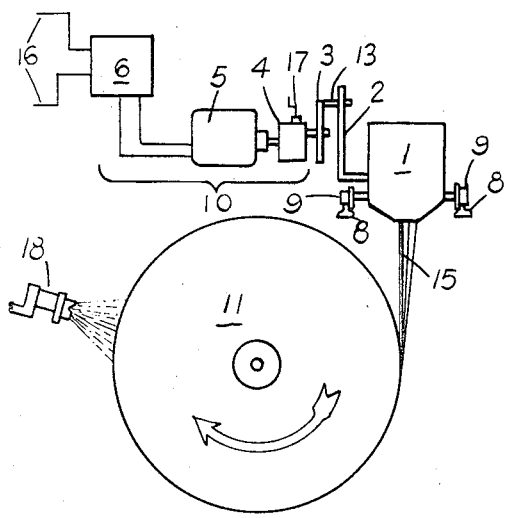
FIG. 1 shows an end elevational view of an apparatus for forming a condensed, filamentous mat on a rotating drum in accordance with the present invention.
Figure 2:
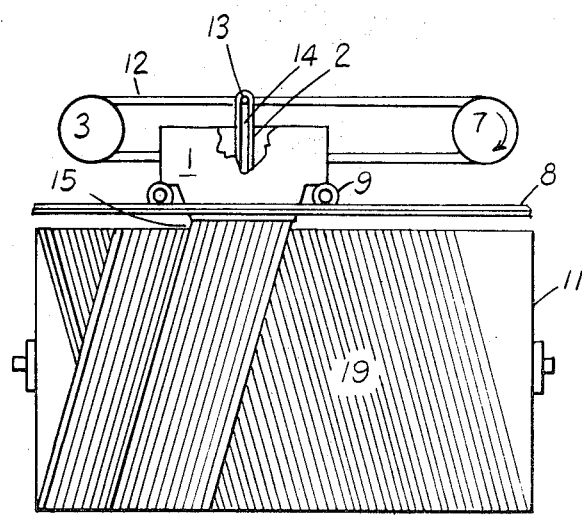
FIG. 2 is a side elevational view of the apparatus of FIG. 1.
Figure 3:
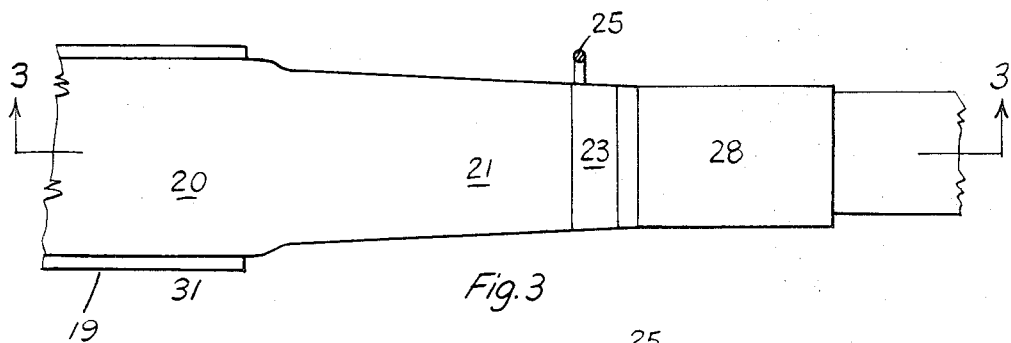
FIG. 3 is a diagrammatic plan view of an apparatus for expanding and compressing a filamentous mat formed by the apparatus of FIGS. 1 and 2 in accordance with one method of the present invention.
Figure 4:
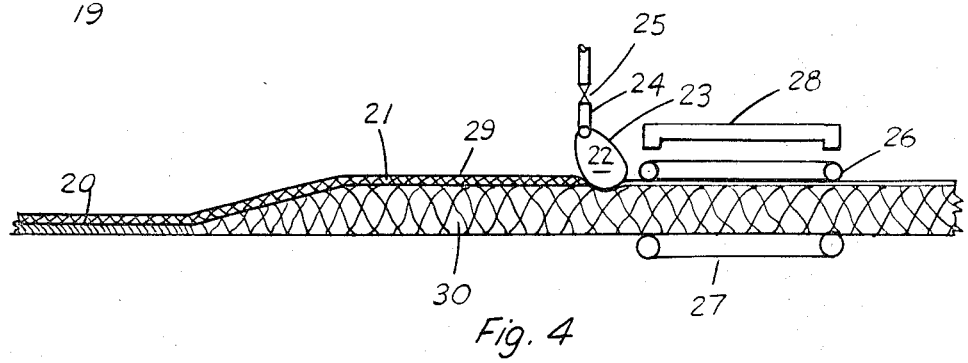
FIG. 4 is a cross-sectional view taken along a plane passing through line 3—3 of FIG. 3.

In accordance with the drawings, there is shown a filament feeder 1 mounted on wheels 9 for reciprocatory motion along tracks 8. Tracks 8 are supported above and generally parallel to a down-turning edge of rotating drum 11 which can be rotated (by means not shown). Filaments of a suitably selected material such as molten glass can be fed from orifices (not shown) in the bottom of feeder 1 to be attenuated by, and collected upon, the rapidly rotating drum 11. Orifices in the bottom of the filament feeder 1 can be disposed in any desired geometric configuration, but usually, they are in longitudinally-extending rows of orifices. The diameter of filaments 15 drawn from filament feeder 1 to drum 11 is influenced by the speed of rotation of drum 11 and the diameter of the orifices.

Filament feeder 1 can be driven back and forth on tracks 8 in reciprocatory traverses by variable speed drive means 10. It will be understood that within the scope of the present invention, drive means 10 may include any suitable combination of elements. A drive motor 5 can be connected to variable speed reducer 4 to turn sprocket 3 at a desired speed. Endless chain 12 can be driven by drive sprocket 3 and driven around idler sprocket 7 where sprockets 3 and 7 can, advantageously, be mounted at opposite ends of drum 11. Drive pin 13 fixed to chain 12 nests in a vertically-extending, pin-receiving slot 14 in arm 2 which is joined to filament feeder 1. Pin 13 is free to move in a vertical direction in slot 14 while driving filament feeder 1 in a generally horizontal direction along tracks 8 in response to movement of chain 12. For example, pin 13 moves with chain 12 in one horizontal direction, and between sprockets 3 and 7, to drive filament feeder 1 accordingly. When pin 13 reaches one of the sprockets, for example sprocket 3, it then moves around sprocket 3 and in a generally vertical direction in slot 14. As pin 13 leaves sprocket 3, filament feeder 1 is driven at the same horizontal speed as chain 12, but in a direction opposite the direction of travel before pin 13 moved around sprocket 3. It will be realized a similar sequence of events occurs as pin 13 passes around sprocket 7, and, therefore, the reciprocatory traverse of filament feeder 1 extends generally from sprocket 3 to sprocket 7 along the aforementioned down-turning edge of rotating drum 11.

The relative traversing speed of filament feeder 1 is changed in accordance with the speed of drive motor 5, which speed can be controlled in any desired manner. One method of controlling the speed of drive motor 5 is to provide a speed regulator device 6 in the power supply 16 to drive motor 5. Speed regulator device 6 can be of the rheostat type and operated manually or automatically in accordance with a selected program to control the speed of drive motor 5 and the traversing speed of filament feeder 1. The angle of lay of filaments collected on rotating drum 11 is determined by the combined relative effect of the traversing speed of feeder 1 and the speed of rotation of drum 11.

A suitable binder can be applied uniformly to mat 19 during its formation by means of spray 18 which can be arranged to periodically traverse the drum surface.

In one example of the present invention, as shown in the drawings, filament feeder 1 can be a furnace containing molten glass. The molten glass can issue from openings (not shown) in the bottom of feeder 1 to form glass filaments 15 which are collected on rotating drum 11 to form condensed mat 19. Separate portions of filamentous mat 19, having differing angles of lay on drum 11, can be created by periodically varying the traversing speed of feeder 1 relative to the rotational speed of drum 11 during formation of mat 19. It will be understood that the angle of lay as referred to in this example is the angle measured between the transverse axis of the rotating drum and the projection of filaments 15 collected on drum 11. The angle of lay is measured in a first quadrant for filaments deposited on drum 11 when feeder 1 traverses drum 11 in one direction. When the direction of traverse of feeder 1 is in the opposite direction, the angle of lay is measured in a mirror quadrant. It will, therefore, be understood that if the traversing speed of feeder 1 is the same for successive traverses in opposite directions, the angle of lay of the filaments deposited can be considered as the same, even though the angle is measured to opposite sides of the transverse axis.

In accordance with the present invention, it is recognized that the angle at which filaments are laid on drum 11 determines the length to which condensed mat 20 can subsequently be expanded; the greater the angle of lay on the drum, the shorter the length to which the condensed mat can subsequently be expanded. Accordingly, portions of mat 19 can be formed during periods of increased traversing speed of feeder 1 to include filaments collected on drum 11 at increased angle of lay. These portions cannot be drawn or stretched to the same length as portions formed during periods of decreased traversing speed to deposit filaments at decreased angles of lay. In mat 19 of the present example, a first portion can be formed on rotating drum 11 at relatively low traversing speed of feeder 1. Also, the relative traversing speed of filament feeder 1 can be changed periodically by speed change linkage 10. Periodically changing the relative traversing speed of feeder 1 during the formation of the first portion of mat 19 introduces filaments having random angles of lay on drum 11, and provides desirable irregularities in the patterns of the filament. The traversing speed can be changed in accordance with a preselected, timed program, regardles of the position of feeder 1 in any particular traverse. In the method of the present example, the portions of the mat having random angles of lay can be provided by periodically stopping the traverse of filament feeder 1 during the formation of first portion of condensed mat 19. The traverse of filament feeder 1 can be periodically stopped by providing speed change linkage 10 with means to stop drive motor 5 for selected periods of time at selected intervals. During the intervals when the traverses of filament feeder 1 are stopped, filaments 15 are drawn directly on rotating drum 11 at a substantially zero degree angle of lay. Therefore, in successive turns of drum 11, filaments 15 fall on top of themselves in contiguous relation to form multi-filament strands. Strands are composed of groups of monofilaments and remain, generally, grouped in the form of filament groups throughout the further processing of mat 19. The filament groups, or strands, can be considered as equivalent to large diameter monofilaments and effectively decrease the average filament concentration in the expanded mat ultimately formed from mat 19. The number of strands in any portion of mat 19, and therefore, the relative filament concentration, can be controlled by the length of the intervals in which feeder 1 is stopped and the frequency at which feeder 1 is stopped. By appropriate selection of frequency and interval of time during which feeder 1 is stopped, a desired filament concentration can be obtained in any selected portion of mat 19.

In the method of the present example, the second portion of mat 19 can be formed by transversely reciprocating filament feeder 1 at increased relative traversing speed along a down-turning edge of rotating drum 11. It will be understood that the maximum relative traversing speed of feeder 1 during formation of second portion of mat 19, for the most part, can be greater than the maximum relative traversing speed of feeder 1 during formation of first portion of mat 19. The filaments drawn to rotating drum 11 are deposited on drum 11 at increased angle of lay with respect to angle of lay of filaments of the first portion. Further, in one method of the present invention where it is desired to form a skin-back filamentous mat, the second portion of mat 19 can be advantageously less than one half as thick as the first formed portion of mat 19.

It has been found that, advantageously, in the expansion of mat 20, the angle of lay of filaments 15 in the aforementioned second formed portion of mat 19 can be 5 to 45 percent greater than the maximum angle of lay of filaments in the aforementioned first portion.

A suitable binder can be applied at any desired time during the formation of mat 21. For purposes of the present example, a water soluble binder can be applied by means of spray 18, which can traverse the rotating drum during the formation of mat 19 on drum 11.

Condensed mat 19 can be cut parallel to the longitudinal axis of drum 11 and removed therefrom to form a condensed mat 20. Flat condensed mat 20 can be expanded by hand or any other suitable method by drawing or stretching one edge in a direction generally transverse to the general lay of fibers in the mat. In stretching mat 20, it expands in the direction of stretching and in the direction of the thickness of the mat to form expanded mat 21. In expanded mat 21, some of the filaments are substantially straight, while others assume a looped or curled configuration as hereinafter described.

From the foregoing, it can be seen that mat 21 includes second portion 29 formed at increased feeder traversing speed, so as to include filaments collected on drum 11 at increased angle of lay. The filaments of portion 29 are substantially straightened in the expansion of mat 20 to form mat 21 and the ultimate length of mat 21 can be controlled by these straightened filaments. Expanded mat 21 also includes portion 30, corresponding to the first portion of mat 19 collected to a maximum feeder traversing speed substantially lower than the feeder traversing speed in the formation of portion 29. The maximum angle of lay of filaments of portion 30 determines the ultimate length to which portion 30 can be stretched. Since the maximum angle of lay of filaments of portion 30 is less than the angle of lay of filaments of portion 29, it follows that, if stretched independently, portion 30 could be stretched further than portion 29.

In expanding mat 20, certain changes occur in the geometric configuration of the mat. Portion 29 would normally stretch to a lesser maximum length than portion 30, with comparable distortion in all its dimensions, because its fibers were collected on drum 19 at a greater angle of lay than the fibers comprising portion 30. However, in the expansion of mat 20, the mat advantageously is drawn beyond the maximum length of stretch for portion 29. Therefore, since portions 29 and 30 are bound together by the binder and by intertwining filaments at the common interface, portion 29 will be stretched to the same length as portion 30, causing portion 29 to be decreased in its dimensional thickness, and fibers in portion 29 to be straightened to form a thin layer of fibers relative the expanded layers of fibers of portion 30.

It will be understood that within the scope of the present invention, the binder may be softened by any desired means. In the present example, binder solvent dispenser means 22 can be a flexible sack 23 which is elongated and extends transversely across the width of expanded mat 21. Furthermore, sack 23 can be disposed so that the lower portion contacts mat 21. Sack 23 halds a quantity of suitable binder solvent such as water and includes appropriate openings (not shown) in the bottom. The openings permit emission of solvent from sack 23 which, advantageously, flows into the area of contact between sack 23 and mat 21. Mat 21 can be partially compressed by the weight of sack 23 during the application of binder solvent. The binder solvent can be continuously supplied to sack 23 as by feed pipe 24, and the rate of emission of solvent from openings in sack 23 can be controlled by the pressure of solvent within sack 23 as by valve 25. In this connection, it will be noted that the straightening and concentration of filaments in portion 29 facilitates uniform distribution of the binder solvent through such portion.

When the binder is softened, the filaments in portion 29 move freely. Since portion 30 stretches portion 29 beyond its normal expansion length, portion 30 pulls and holds portion 29 in tension, and the filaments in portion 29 are further straightened when allowed to move freely. When the filaments are further straightened, the thickness of portion 29 is further decreased, and therefore, the filament concentration of portion 29 is increased. To further decrease the thickness of portion 29, mat 21 can then be passed through compressive conveyors 27 and 28 to further compress mat 21 and increase the filament concentration in portion 29. Compression assures the formation of a "skin-like" layer. In accordance with the present invention, the compression occurs primarily in portion 29 because the binder is in softened condition during the compression steps and the filaments have been straightened and concentrated in the manner aforedescribed.

After the desired compression is attained, the binder can then be hardened by any convenient means, and in the method of the present example, the binder can be hardened by heating in oven 28, while mat 21 is in the desired compressed condition.

It will be understood that within the scope of the present invention, filamentous mats may be made having more than the two portions of differing angle of lay as hereindescribed. Further, in forming the condensed mat, the portions may be deposited on the drum in any desired order.

The invention claimed is:

1. A method for making expanded filamentous mats comprising: feeding filaments from filament feeder means to filament collector means; collecting filaments on said collector means at at least one angle of lay relative to a preselected axis of said collector to form the first side of said mat; collecting said filaments at a selected, angle of lay greater than the maximum angle of lay of filaments of said first portion to form the second side of said mat; applying a binder to said mat; and stretching said mat in a direction transverse the general lay of filaments of said mat to expand said mat in thickness and length so said first portion is expanded and said second portion is initially expanded in thickness and is subsequently stretched a sufficient amount to substantially straighten the filaments thereof; compressing only said second portion of said mat a preselected amount; and, retaining said second portion in selectively compressed condition to form a substantially incompressible skin adjacent one side of said first portion.

References Cited

UNITED STATES PATENTS

| 3,051,602 | 8/1962 | Schairbaum | 156—174X |
| 2,609,320 | 9/1952 | Modigliani I | 156—174 |
| 2,546,230 | 3/1951 | Modigliana II | 156—229X |
| 2,505,045 | 4/1950 | Holcomb | 156—167 |

JOHN T. GOOLKASIAN, Primary Examiner

M. E. McCAMISH, Assistant Examiner

U.S. Cl. X.R.

156—173, 219